Patented Jan. 8, 1935

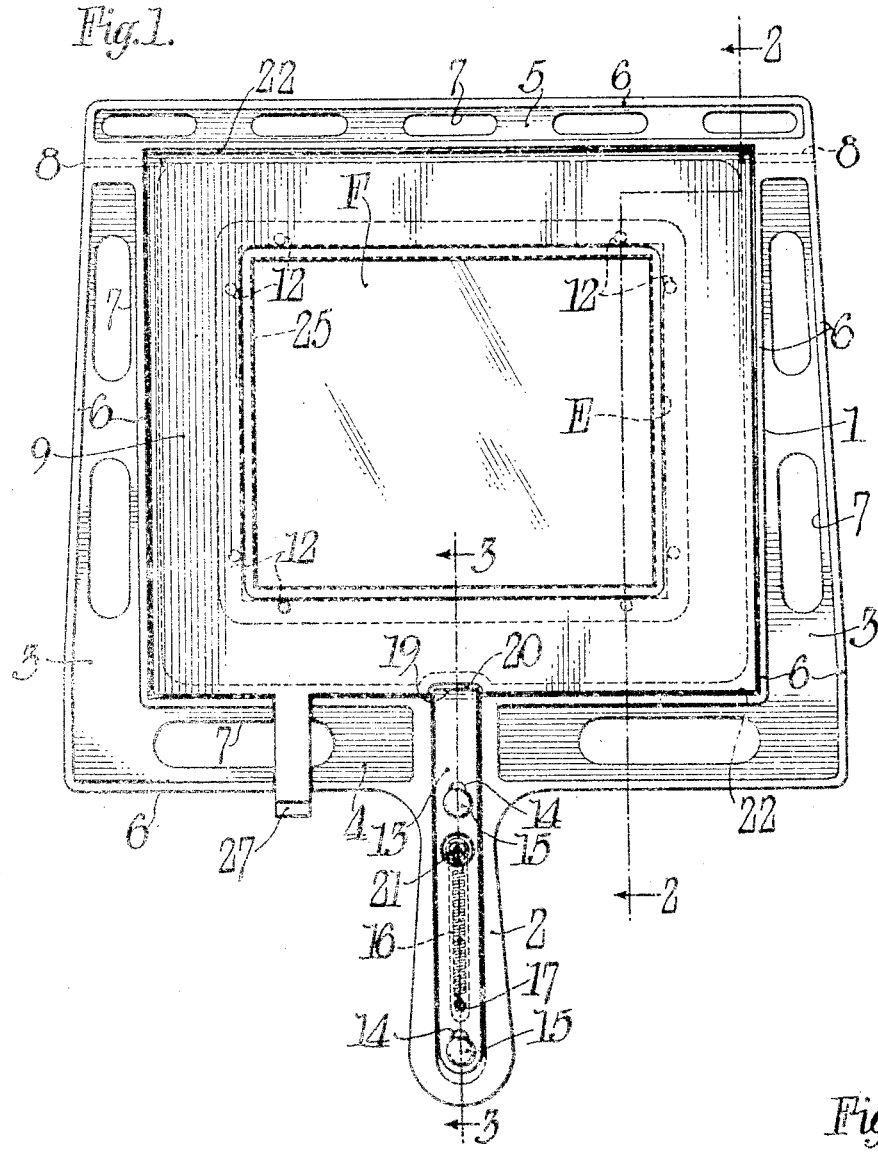
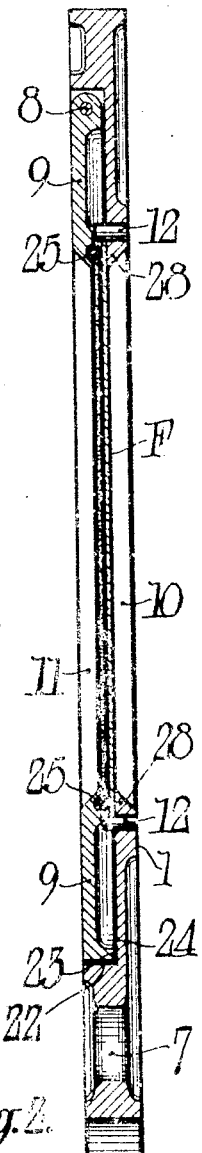
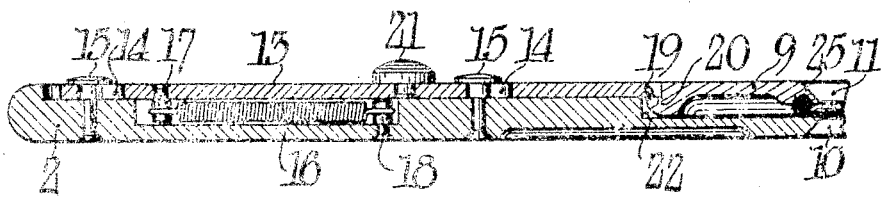

1,987,067

UNITED STATES PATENT OFFICE 1,987,067

WET FILM HOLDER FOR PROJECTION PRINTING

Roger P. Leavitt, Rochester, N. Y., assignor to Eastman Kodak Company, Rochester, N. Y., a corporation of New York Application August 26, 1933, Serial No. 686,962

3 Claims. (Cl. 88—24)

This invention relates to photography and more particularly to holders for photographic film adapted to support a film substantially in a plane for projection printing.

One object of my invention is to provide a holder which will receive and hold a film which has been treated with the various fluid treatments for developing, fixing, and washing and which has not been dried. Another object of my invention is to provide a holder which will retain a film in a flat position by means of the extreme edges of the film and one which will not mar the delicate surfaces of a film when in either a wet or dry condition. Another object of my invention is to provide a film holder especially adapted for use in projection printing. Another object of my invention is to provide a holder which will retain a film in position even though only light pressure is placed upon the film in the holder. Another object of my invention is to provide a film holding means comprising two overlapping frames, one of the frames being equipped with a smooth, rounded, resilient film engaging member to lightly press the edges of a film flat on the other frame. Still another object of my invention is to provide a holder which will support a sheet of film flat in position for printing without the use of the usual glass. Another object of my invention is to provide a holder consisting of two hinged frames arranged so that they can be readily and rapidly manipulated with one hand, and other objects will appear from the following specification, the novel features being particularly pointed out in the claims at the end thereof.

Coming now to the drawing wherein like reference characters denote like parts throughout:

Fig. 1 is a top plan view of a holder constructed in accordance with and embodying a preferred form of my invention.

Fig. 2 is an enlarged section taken on line 2—2 of Fig. 1.

Fig. 3 is an enlarged section taken on line 3—3 of Fig. 1.

My holder consists broadly in a pair of hinged frames having means for locating and holding a film between the two registering openings of the frame.

As indicated in Fig. 1 the holder may consist of a main frame 1 which is provided with a handle 2. The side edges 3 and the end edges 4 and 5 are preferably made of a casting or die-casting having ribs 6 to strengthen the material and having openings 7 to reduce the weight of the part.

The frame 1 carries a pair of hinge pintles 8 which support a second frame member 9, this member being hinged on the pintles 8 so that it can move to and from an operative position in which it will retain a film F in position on the frame 1. The frame 1, as best shown in Fig. 2, is provided with a central aperture 10 and the frame 9 has a similar aperture 11, these two apertures being in registration when the frame 9 is in an operative position. Around the edge of the frame 10 there are a plurality of pins 12, these pins being adapted to define the position of the outer edge E of a film F being positioned in the holder (Fig. 1).

The frame 9 is supported by the hinge pintle 8 at one end and is retained in an operative position by means of a sliding latch member 13. This member, as best shown in Fig. 3, consists of a plate, apertured at 14 to receive a pair of studs 15 carried by the frame 1. A spring 16 extending between a stud 17 on the latch 13 and between a stud 18 on the handle 2 normally holds the latch in the position shown in Fig. 3 in which the nose of the latch member 19 will engage a notch 20 on the frame 9. A push-button 21 is provided for sliding this latch to release the frame member 9.

The frame member 9 fits into an opening 22 in the frame member 1 and is adapted to lie substantially flush in this opening. There is but little clearance between the inner edge 23 of the frame member 9 and the bottom 24 of the opening 22 into which the frame fits (see Fig. 2). This forms a stop limiting the movement of frames 10 and 11 toward each other and consequently a stop limiting the pressure which can be applied upon the smooth soft rubber gasket 25 when the two frame members are latched together.

Frame 9 is provided with a film holding member which preferably consists of a rubber gasket 25. This preferably has a rounded surface for contacting with the film F and is soft so that when it contacts with the sensitive emulsion surface of a photographic film, even though this surface should be still wet, it will not damage the film. While I prefer to use a round rubber gasket, as shown in the drawing, it is obvious that any other smooth, soft, resilient material, such as soft leather, will be suitable for this purpose.

The operation of the device is quite simple. The frame 9 may be unlatched by moving the push-button 21 to move the latch member 13 against the action of the spring 16, thus releasing the engaging latch members 19—20. The operator may then use the arm 27 to raise the frame 9 and swing it about the hinge pintles 8. When the two frames are opened the main frame 1 may be held in a substantially vertical position and a film F may be dropped into place by bringing the edges E of the film into engagement with two or more of the locating pins 12 carried by the frame 1. While it is usually preferable to have the emulsion surface of the film uppermost because this is the surface which can be most readily damaged when wet, if the film is dry it is not important.

The film having been located by the pins 12 of the frame 1, the frame member 9 may then be swung about the hinge pintles 8 into an operative position in which the latch 19—20 will snap into place and the film will be firmly held in position.

It should be noted that the edge of the film F lies over a flange 28 which surrounds the opening 10 in the frame 1, but since only the edges of the film are so held the exposure area of the film is not damaged. The film is held by the light pressure exerted on the smooth, round, resilient gasket member 25. This gasket, as appears from Fig. 2, presses only on a very small area on the edges of the film F. Consequently, if the film is a damp or wet film, the emulsion surface is always placed in position to be contacted by the rubber gasket. The pressure exerted by the gasket is so light and the gasket is smooth and has such small contact with the delicate film surface that it does not damage the film.

While, of course, this film holder is perfectly suitable for a dry film or a photographic plate, it is designed especially so as not to mar the delicate damp surfaces of a recently developed film. It is, therefore, particularly adapted for newspaper work and for other photographers who must produce a print from a film before they have time to dry it.

I have found that prints can be made from a film taken from the wash water and then the film can be removed from the holder and dried without leaving on the finished film any evidence of such use. In other words, a film can be used without marring the surface in any way by using the holder above described.

Having thus described my invention what I claim as new and desire to secure by Letters Patent of the United States is:

1. In a device for holding wet films in position for printing, the combination with a frame for supporting the edges of one side of a film, a second frame hingedly attached to the first frame, the two frames having registering openings, stops on the frames for limiting their relative movement toward each other, a smooth, resilient film contacting member on one frame including a rounded surface for engaging the film whereby a wet film may be held between the two frames without marring the film surface, said stops being so positioned that they limit the pressure which may be applied to the rounded surface for engaging the film when the two frames are brought into contact.

2. In a device for holding wet films in position for printing, the combination with a frame, a second frame hingedly attached to the first frame, the two frames having registering openings, a smooth flange surrounding the opening of one frame and adapted to support the edges of a film, a smooth, resilient film contacting member carried about the opening on the other frame and adapted to hold a film against the smooth flange of the first-mentioned flange, and a latch arranged between the two frames adapted to hold the frames together, the latch and hinge being positioned to limit the pressure on the resilient film contacting member when said frames are latched together.

3. In a device for holding wet films in position for projection printing, the combination with a frame having an opening in the center, of means carried by said frame for positioning the edges of a film relative to said opening, a second frame movably mounted on the first frame and movable to and from an operative position with respect thereto, cooperating parts on the two frame members forming limiting stops and a film engaging member surrounding the opening in said second frame member comprising a soft rubber gasket, said rubber gasket including a rounded film contacting surface adapted to engage a negligible area of the film when the frames are moved together until the stops contact, said gasket surrounding said frame opening to engage a film edge positioned by the first-mentioned frame when said second frame is in an operative position with respect to said first-mentioned frame.

ROGER P. LEAVITT.